Feb. 9, 1960     E. J. CLARK ET AL     2,923,987
ASSEMBLY FOR MAKING A BEARING
Original Filed Sept. 23, 1955

INVENTORS
Earl J. Clark &
BY Leonard J. Schmid
Attorney

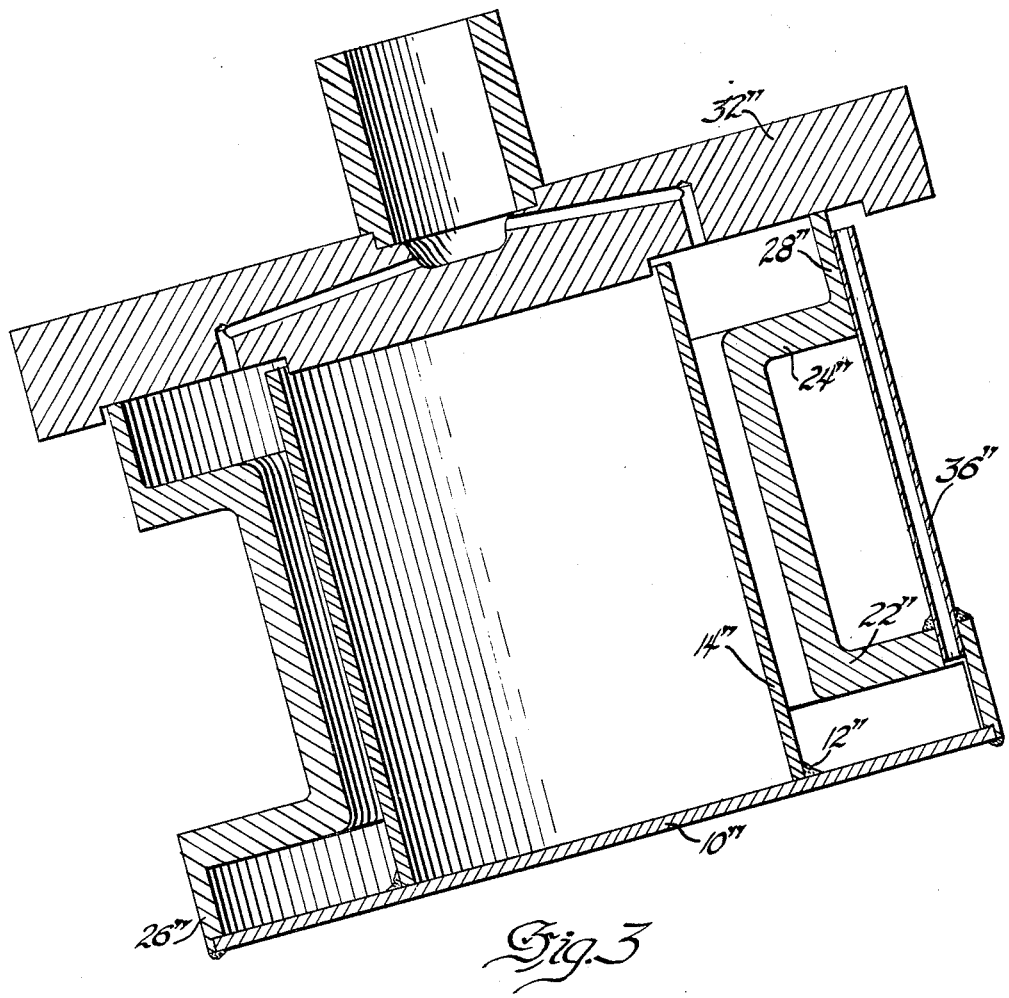

United States Patent Office 2,923,987
Patented Feb. 9, 1960

2,923,987

ASSEMBLY FOR MAKING A BEARING

Earl J. Clark, Indianapolis, and Leonard J. Schmid, Brownsburg, Ind., assignors to General Motors Corporation, Detroit, Mich., a corporation of Delaware Continuation of application Serial No. 536,063, September 23, 1955. This application February 19, 1958, Serial No. 716,120

1 Claim. (Cl. 22—123)

This invention relates to a method of making double-flanged bearings and is more particularly concerned with a procedure for forming such bearings comprising a reinforcing back to which is bonded bearing material on the outer faces of the flanges as well as to the sleeve portion of the bearing. The present application is a continuation of United States patent application Serial No. 536,063 which was filed on September 23, 1955, now abandoned.

In the casting of bearing metals to form double thrust face bearings it has been difficult, prior to this invention, to prevent the entrapment of gas or other flux in the bearing metal adjacent to the outer surface of the lower flange. The primary object of the present invention is to provide a method of making double-flanged bearings wherein porosity and inclusions in the bearing metal of the lower flange are eliminated. Other objects and advantages will become more apparent as the description proceeds.

Reference is herewith made to the accompanying drawings in which:

Figure 3 is a view similar to that of Figures 1 and 2 and showing a further embodiment of means for carrying out the invention.

The invention will be described in connection with the formation of double-flanged thrust bearings having a steel back with bronze bearing metal bonded not only to the cylindrical portion of the back but also to the faces of both flanges. It will be understood, of course, that the principles of the invention are applicable to other backing materials and bearing metals.

Figure 1:
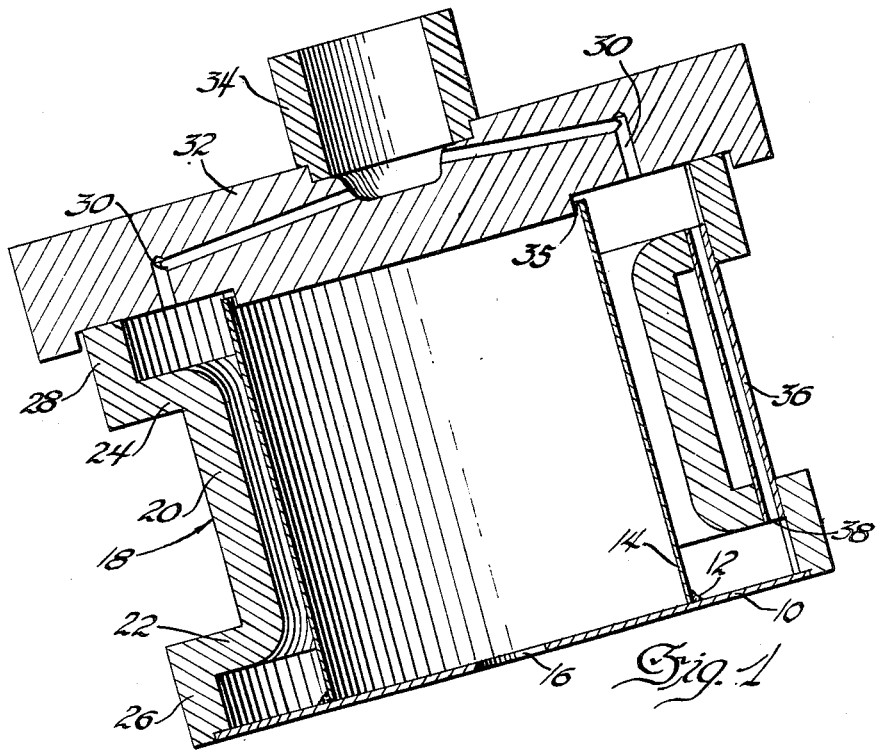
Figure 1 is a cross sectional view of means for carrying out the method of forming a bearing in accordance with one embodiment of the invention.

In Figure 1 there is illustrated a mold comprising a plate 10 to which is secured as by a weld 12 a cylindrical sleeve 14. The plate 10 may have an opening 16 formed therein for a purpose to be described later. The composite structure comprising the base 10 and sleeve 14 cooperates with a steel backing member indicated generally by 18 and is secured thereto as by welding. This backing comprises a sleeve portion 20, a lower flange 22, an upper flange 24, a downwardly extending portion 26 for the lower flange and an upwardly extending portion 28 for the upper flange. As shown in Figure 1 the base is inclined at an angle of approximately 15° to the horizontal. This position is the preferred position while the space between the mold and bearing back is being filled with molten bronze bearing material. The molten bronze bearing material is cast into the space between the steel backing member and the composite structure comprising the base 10 and sleeve 14 through a multiplicity of passages 30 formed in a cap 32 formed of refractory material having a pouring basin 34. While best results have been obtained when the angularity of the base 10 with reference to the horizontal is approximately 15°, satisfactory results for most purposes may be obtained with an angularity on the order of about 5° to 25°.

At the right-hand side of Figure 1 there is shown a tube 36 leading from a point 38 adjacent the lower surface of the lower flange to the upper surface of the upper flange. In this form the tube passes through both the upper and lower flanges. This tube is located at the high or elevated side of the mold and backing member while the bearing is being cast as is apparent. As the molten bearing metal flows into the mold it forces gas or other flux upwardly through the tube 36. The gas or other flux then escapes into the sleeve portion of the mold through space 35 between the cover and sleeve 14 and then through opening 16. Gas can also escape between the cover and upper edge of the backing member. As the mold becomes partially or nearly full and after the gas or other flux has been eliminated through the tube 36 the mold and bearing backing may be placed in a horizontal position during solidification of the bearing metal. After the metal has solidified the mold portion and portions of the upper and lower flanges of the backing member outwardly from the inner side of tube 36 may be removed and the bearing machined to final dimensions. The result is a double-flanged steel-backed bearing having cast bearing metal strongly bonded to the faces of both the upper and lower flanges as well as the clindrical portion of the bearing. Porosity and inclusions in the bearing metal on the lower flange are eliminated.

Figure 2:
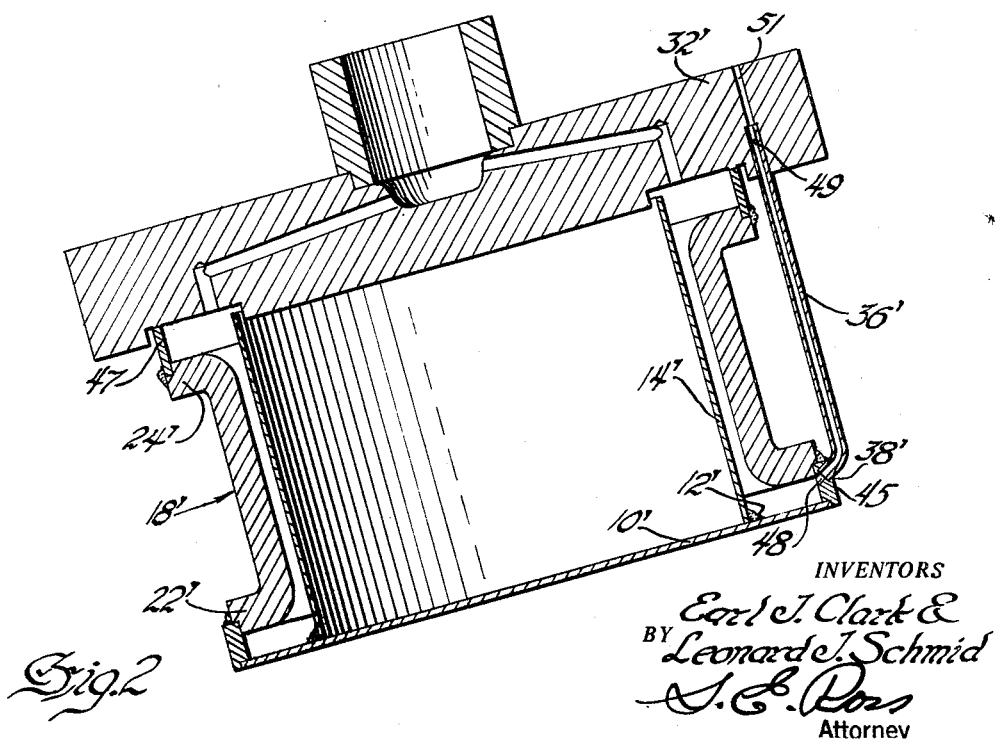
Figure 2 is a view similar to Figure 1 showing a slightly modified form of mold construction and different venting means.

Figure 2 illustrates a somewhat different form of apparatus for carrying out the invention. In the construction illustrated in this figure there is provided a mold comprising a sleeve 14' welded at 12' to a base 10'. An annular section 45 is welded to the lower flange 22' of the backing member 18' and to the base 10'. The upper flange 24' has welded thereto an upwardly extending annular portion 47. At the right-hand end of this figure there is shown a tube 36', the lower end 38' being secured to the annular section 45 and in alignment with an opening 48 leading to the portion of the mold immediately below the lower flange of the bearing back at this point. The upper end 49 of sleeve 36' extends into an opening 51 in cover 32' for escape of gas or other flux during the operation of casting the bearing material into the space between the backing member and mold. After the cast bearing metal is solidified the upper and lower annular members 45 and 47 and tube 36' are removed and the bearing metal and backing member machined to final dimensions.

Figure 3 illustrates still another modification somewhat similar to the construction of Figure 1. The construction in Figure 3 comprises a mold formed of a sleeve 14" welded at 12" to a base 10". The base 10" is welded to downwardly extending member 26" from lower flange 22". A cover 32" generally similar to the covers of Figures 1 and 2 is provided. In the embodiment of Figure 3 a tube 36" is welded or otherwise sealed to the lower flange 22" of the backing member and the upper portion of the tube is on the outside of the upper flange 24" and upwardly extending portion 28". After solidification of the cast bearing metal the extensions of the flanges and tube are removed and bearing machined to final dimensions.

The casting techniques employed with the embodiments of Figures 2 and 3 are generally similar to that employed with the embodiment of Figure 1. Best results are obtained when the angularity of the mold and backing member with respect to the horizontal during pouring of bearing metal into the mold is about 15°. However, an angularity of about 5° to 25° may be employed with satisfactory results. As in the case of the embodiment of Figure 1 the tubes for escape of gas or other flux in the modifications of Figures 2 and 3 are located at the high side of the bearing backing so that the gas or other flux is forced out of the mold through the tubes as the molten bearing metal fills the mold. As a result, a strongly bonded double-flanged bearing is provided with the elimination of porosity and inclusions.

In the formation of the bearings by any of the embodiments illustrated and described herein, the assembled mold and backing member may be heated in a furnace having a nonoxidizing or reducing atmosphere therein. A typical analysis of a highly satisfactory nonoxidizing atmosphere is as follows:

| Constituent: | Percent by volume |
| --- | --- |
| Hydrogen | 15.5 |
| Carbon monoxide | 11.5 |
| Carbon dioxide | 3.5 |
| Nitrogen | Bal. |

Dew Point—45° F.

The heating is such that the molten bearing metal being cast is not chilled below the melting point when it comes into contact with the mold and back. Generally, therefore, the mold and back are heated somewhat above the melting point of the bearing metal. In the case of a bronze or leaded-bronze, a temperature on the order of 2000° F. has proven especially satisfactory in practice.

It will be understood, of course, that the temperature will vary with the melting point of the particular bearing metal being employed. The nonoxidizing or reducing gas insures clean surfaces on the bearing back so that the bearing metal will become strongly bonded thereto. Under some conditions it is contemplated that a flux may be used that is solid under atmospheric conditions but which will become fluid or molten at the temperature to which the mold and bearing back are heated. However the gaseous flux is greatly preferred as it is more readily removed from beneath the lower flange by the molten bearing metal being cast in the mold.

Various changes and modifications of the embodiments of our invention described herein may be made without departing from the principles and spirit of the invention.

We claim:

An assembly for casting molten bearing metal into contact with a bearing back to cause said bearing metal to adhere to said back, said assembly comprising a generally cylindrical bearing back of strong metal having a radially extending upper flange and a radially extending lower flange, a generally cylindrical mold member positioned within said bearing back to provide an annular space therebetween for receiving molten bearing metal, a cap of refractory material positioned over said upper flange and said first mold member containing a pouring basin and gate passages leading from said pouring basin to said annular space, a mold base secured to said lower flange and said generally cylindrical mold member, means separating said mold base from at least a part of said lower flange to provide a portion of the mold cavity therebetween and tube leading from said portion of the mold cavity to the atmosphere external of said assembly to permit the escape of gases generated therein upon pouring said bearing metal into said annular space, means for inclining said assembly so that said base is at an angle of about 5° to 25° to the horizontal with said tube being located at the elevated side of the assembly.

References Cited in the file of this patent
UNITED STATES PATENTS

| | | |
| --- | --- | --- |
| 422,873 | Beddall | Mar. 4, 1890 |
| 795,830 | Hanna | Aug. 1, 1905 |
| 1,171,275 | Sullivan | Feb. 8, 1916 |
| 2,235,199 | Chace | Mar. 18, 1941 |
| 2,530,853 | Brennan | Nov. 21, 1950 |